(12) United States Patent
He et al.

(10) Patent No.: US 11,845,352 B2
(45) Date of Patent: Dec. 19, 2023

(54) POWER SUPPLY CONTROL METHOD FOR VEHICLE, VEHICLE, CONTROL UNIT AND MEDIUM

(71) Applicant: Beijing Tusen Zhitu Technology Co., Ltd., Beijing (CN)

(72) Inventors: Xiaokang He, Beijing (CN); Pingyuan Ji, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/817,957

(22) Filed: Aug. 5, 2022

(65) Prior Publication Data
US 2023/0041022 A1 Feb. 9, 2023

(30) Foreign Application Priority Data

Aug. 6, 2021 (CN) .......................... 202110902736.8

(51) Int. Cl.
*B60L 53/60* (2019.01)
*H02J 9/06* (2006.01)
*B60L 1/00* (2006.01)

(52) U.S. Cl.
CPC ................. *B60L 53/60* (2019.02); *B60L 1/00* (2013.01); *H02J 9/066* (2013.01); *H02J 9/068* (2020.01); *H02J 2310/46* (2020.01); *H02J 2310/48* (2020.01); *Y02T 90/12* (2013.01)

(58) Field of Classification Search
CPC .......... B60L 53/60; B60L 1/00; H02J 2310/46
See application file for complete search history.

(56) References Cited

U.S. PATENT DOCUMENTS

| | | | |
|---|---|---|---|
| 10,640,004 | B2 | 5/2020 | Patel |
| 2009/0024267 | A1 | 1/2009 | Kawai |
| 2010/0116571 | A1 | 5/2010 | Suzuki |
| 2010/0280698 | A1 | 11/2010 | Ichikawa |
| 2011/0046828 | A1 | 2/2011 | Chander et al. |

(Continued)

FOREIGN PATENT DOCUMENTS

| | | |
|---|---|---|
| CN | 108646714 A | 10/2018 |
| CN | 209257911 U | 8/2019 |

(Continued)

OTHER PUBLICATIONS

Extended European Search Report from corresponding EP Application No. 22187214 dated, Dec. 23, 2022.

*Primary Examiner* — Daniel Cavallari
(74) *Attorney, Agent, or Firm* — Perkins Coie LLP

(57) ABSTRACT

The present disclosure relates to a power supply control method for a vehicle, a vehicle, a control unit, a computer-readable storage medium and a computer program product. The vehicle comprises an electrical equipment, a relay and a power interface, wherein the power interface is electrically coupled to the electrical equipment via the relay. The method comprises: determining whether the power interface is coupled to an external power source; determining whether a voltage of the external power source is within a predetermined range when the power interface is coupled to the external power source; and controlling the relay to be switched on in response to the voltage of the external power source being within the predetermined range.

20 Claims, 4 Drawing Sheets

(56) References Cited

U.S. PATENT DOCUMENTS

| | | | | |
|---|---|---|---|---|
| 2016/0082852 | A1* | 3/2016 | Kim | G01K 7/16 |
| | | | | 439/620.21 |
| 2022/0247191 | A1* | 8/2022 | Niwa | H02J 7/0042 |
| 2022/0289051 | A1* | 9/2022 | Huang | H01R 24/30 |
| 2022/0308117 | A1* | 9/2022 | Sugo | H02J 7/02 |

FOREIGN PATENT DOCUMENTS

| | | |
|---|---|---|
| CN | 110784013 A | 2/2020 |
| CN | 111516509 A | 8/2020 |

\* cited by examiner

POWER SUPPLY CONTROL METHOD FOR VEHICLE, VEHICLE, CONTROL UNIT AND MEDIUM

CROSS-REFERENCE TO RELATED APPLICATION(S)

The present disclosure claims priority to Chinese Patent Application No. 202110902736.8, titled "POWER SUPPLY CONTROL METHOD FOR VEHICLE, VEHICLE, CONTROL UNIT AND MEDIUM," filed on Aug. 6, 2021, the content of which is incorporated herein by reference in its entirety.

TECHNICAL FIELD

The present disclosure relates to the field of vehicle control technologies and power supply control technologies for vehicles, and specifically to a power supply control method for a vehicle, a vehicle, a control unit, a computer-readable storage medium and a computer program product.

BACKGROUND

Electrical equipment in a vehicle may need to operate while the vehicle is parked. In this case, the electrical equipment is usually powered by the vehicle power source in the vehicle, i.e., by an engine or a battery in the vehicle. However, if power is supplied by the engine, the engine is required to continuously work while the vehicle has been parked, resulting in environmental pollution at the parking place (especially, the indoor parking place) of the vehicle; if power is supplied by the battery, the battery may be over-discharged, resulting in failure to restart the vehicle.

SUMMARY

According to an aspect of the present disclosure, provided is a power supply control method for a vehicle, wherein the vehicle comprises an electrical equipment, a relay and a power source interface, the power source interface being electrically coupled to the electrical equipment via the relay, the method comprising: determining whether the power interface is coupled to an external power source; determining whether a voltage of the external power source is within a predetermined range in response to the power interface being coupled to the external power source; and controlling the relay to be switched on in response to the voltage of the external power source being within the predetermined range.

According to another aspect of the present disclosure, provided is a vehicle, which comprises: an electrical equipment; a relay; a power interface electrically coupled to the electrical equipment via the relay; and a control unit configured for: determining whether the power interface is coupled to an external power source; determining whether a voltage of the external power source is within a predetermined range when the power interface is coupled to the external power source; and controlling the relay to be switched on in response to the voltage of the external power source being within the predetermined range.

According to another aspect of the present disclosure, provided is a control unit, which comprises: at least one processor; and at least one memory having instructions stored therein, wherein the instructions, when executed by the at least one processor, cause the at least one processor to perform the method as described herein.

According to another aspect of the present disclosure, provided is a computer-readable storage medium having program instructions stored therein, wherein the instructions, when executed by a processor of a control unit, cause the control unit to perform the method as described herein.

According to another aspect of the present disclosure, provided is a computer program product comprising a computer program, wherein the computer program, when executed by a processor, implements the method as described herein.

According to one or more embodiments of the present disclosure, the external power source is used to supply power to the electrical equipment without using power from the engine or the battery.

It should be understood that what is described in this section is not intended to identify key or critical features of the embodiments of the present disclosure, and it is also not intended to limit the scope of the present disclosure. Other features of the present disclosure will become apparent from the following description.

BRIEF DESCRIPTION OF THE DRAWINGS

The accompanying drawings illustrate the exemplary embodiments and constitute a part of the specification, and, together with the text description of the specification, are provided to illustrate the exemplary implementations of the embodiments. The illustrated embodiments are for purposes of example only and do not limit the scope of the claims. Throughout the accompanying drawings, identical reference numerals designate similar, but not necessarily identical, elements.

DETAILED DESCRIPTION

Exemplary embodiments of the present disclosure are described below with reference to the accompanying drawings, in which various details of embodiments of the present disclosure are included to assist understanding, and these embodiments are to be considered as merely exemplary. Accordingly, it will be appreciated by those of ordinary skills in the art that various changes and modifications may be made to the embodiments described herein without departing from the scope of the present disclosure. In addition, description of generally known functions and constructions is omitted in the following description for clarity and conciseness.

In the present disclosure, unless otherwise specified, the terms "first," "second," etc., are used for describing various elements and are not intended to define a positional relationship, a temporal relationship or an importance relationship of these elements, and such terms are used only for distinguishing one element from another. In some examples, a first element and a second element may refer to the same instance of the element, while in some cases they may refer to different instances based on the context of the description.

The terms used in the description of the various described examples in the present disclosure are for the purpose of describing particular examples only and are not intended to be limiting. Unless otherwise clearly indicated in the context, if the number of elements is not specifically limited, there may be one or a plurality of elements. Furthermore, the term "and/or" used herein encompasses any of and all possible combinations of the listed items.

Electrical equipment in a vehicle (e.g., an autonomous driving system of the vehicle) may need to operate while the vehicle is parked. An engine or a battery in the vehicle may be used to supply power to the electrical equipment. However, if the engine is used for supplying power to the electrical equipment, there will be environmental pollution at the parking place of the vehicle; if the battery is used for supplying power to the electrical equipment, the battery may be over-discharged.

Accordingly, the present disclosure provides a power supply control method for a vehicle, wherein the vehicle comprises an electrical equipment, a relay and a power source interface, the power source interface is electrically coupled to the electrical equipment via the relay, and the method comprises: determining whether the power interface is coupled to an external power source; determining whether a voltage of the external power source is within a predetermined range in response to the power interface being coupled to the external power source; and controlling the relay to be switched on in response to the voltage of the external power source being within the predetermined range.

Figure 1:
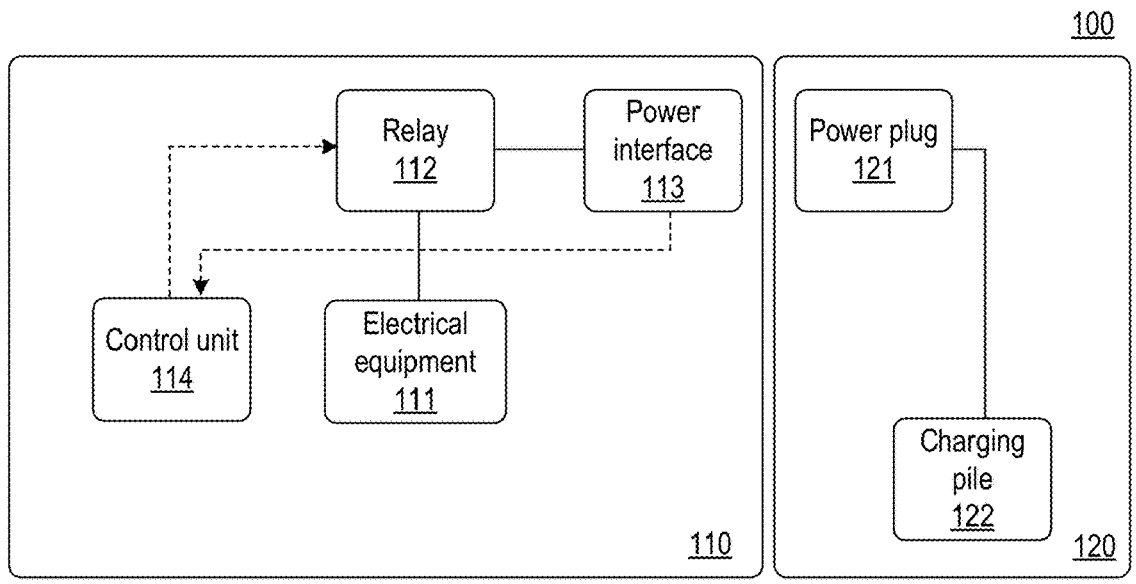
FIG. 1 is a structural block diagram of a vehicle power supply system according to an exemplary embodiment.

FIG. 1 is a structural block diagram of a vehicle power supply system 100 according to an exemplary embodiment, wherein signal connections are shown in dashed lines and power connections are shown in solid lines.

As shown in FIG. 1, the vehicle power supply system 100 comprises a vehicle 110 and an external power source 120 that supplies power to the vehicle 110.

According to some embodiments, the vehicle 110 comprises an electrical equipment 111, a relay 112, a power interface 113 and a control unit 114. The power interface 113 is electrically coupled to the electrical equipment 111 via the relay 112. When the vehicle 110 is in a parked state, the external power source 120 may be connected through the power interface 113 to supply power to the electrical equipment 111. For example, a power plug 121 of the external power source 120 is inserted into the power interface 113, so that a charging pile 122 of the external power source 120 supplies power to the electrical equipment 111 through the power interface 113.

According to some embodiments, the electrical equipment comprises an autonomous driving system, which may comprise at least one of a sensor, a vehicle-mounted communication device and a computing apparatus.

According to some embodiments, the control unit 114 may detect a state of the power interface 113 (e.g., detect whether the power interface 113 is coupled to an external power source), so as to control whether the external power source 120 is to be used to supply power to the electrical equipment 111. According to some embodiments, the control unit 114 is configured for: determining whether the power interface 113 is coupled to the external power source 120; determining whether a voltage of the external power source 120 is within a predetermined range in response to the power interface 113 being coupled to the external power source 120; and controlling the relay 112 to be switched on in response to the voltage of the external power source 120 being within the predetermined range.

According to some embodiments, the power plug 121 and the power interface 113 both have an electric conductor therein, and when the power plug 121 is inserted into the power interface 113, the power plug 121 contacts a corresponding electric conductor in the power interface 113, thereby electrically connecting the power plug 121 and the power interface 113. During inserting the power plug 121 into the power interface 113, a contact area of the power plug 121 and the corresponding electric conductor in the power interface 113 is gradually increased, during which electric connection between the power plug 121 and the power interface 113 is unstable. Therefore, in order to ensure the safety of the system, in some embodiments of the present application, after the electric connection between the power plug 121 and the power interface 113 is stabilized, that is, when the contact area between the power plug 121 and the corresponding electric conductor in the power interface 113 does not change any more, the power interface 113 sends a power-on signal to the control unit 114, and the control unit 114 receives the power-on signal from the power interface 113 and determines that the power interface 113 is coupled to the external power source 120.

According to some embodiments, the vehicle 110 is a fuel-powered vehicle. The vehicle 110 may also comprise an engine, a battery and a generator (not shown in FIG. 1). The generator is driven by the engine to convert mechanical energy from the engine into electrical energy and provides the electrical energy to the control unit and the electrical equipment, and the generator may also provide electrical energy to the battery.

Figure 2:
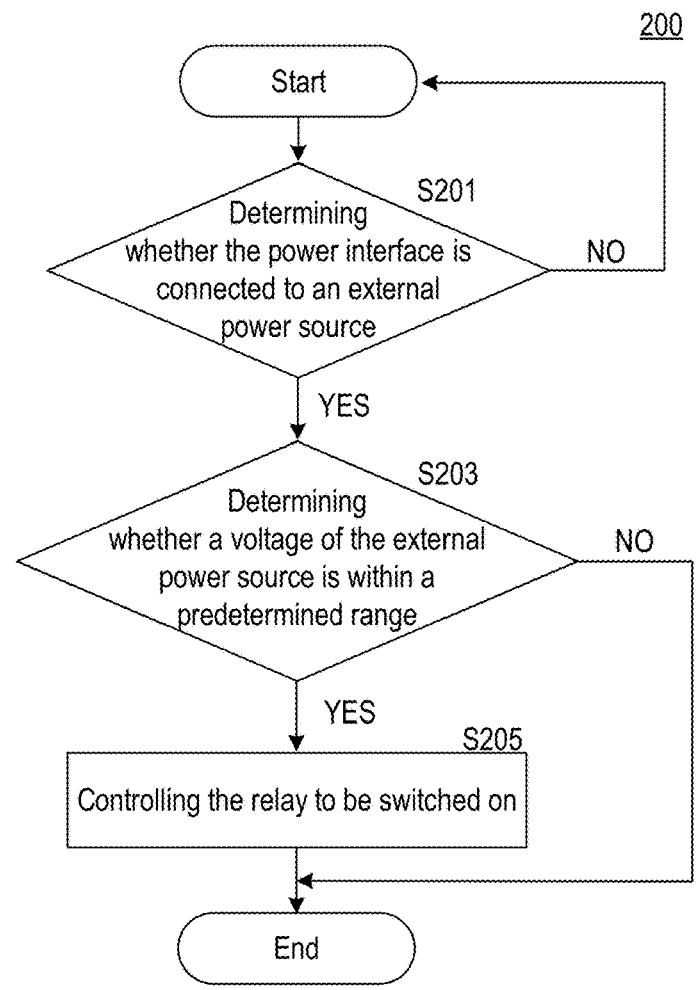
FIG. 2 is a flowchart of a power supply control method for a vehicle according to an exemplary embodiment.

FIG. 2 is a flowchart of a power supply control method 200 for a vehicle according to an exemplary embodiment. According to some embodiments, the method 200 may be performed by the control unit 114 in the vehicle 110 as shown in FIG. 1.

At step S201, it is determined whether the power interface is connected to an external power source. According to some embodiments, in response to determining that the power interface is connected to the external power source ("YES"), the operation proceeds to step S203. According to other embodiments, in response to determining that the power interface is not connected to the external power source ("NO"), the operation returns to step S201.

According to some embodiments, whether the power interface is connected to the external power source can be determined by detecting whether a power-on signal is received from the power interface. For example, when the power interface is connected to a power plug of the external power source, the power interface generates the power-on signal.

According to other embodiments, whether the power interface is connected to the external power source can be determined by detecting a voltage of the power interface. For example, when it is detected that the voltage of the power interface is not zero, it is determined that the power interface is connected to the external power source.

According to some embodiments, when the vehicle is detected to be in a parked state (for example, when it is detected that the vehicle hasn't moved for a period of time) and operating power is needed for the electrical equipment, the user is reminded to connect the vehicle to the external power source so as to avoid continuously using the engine or the battery to supply power to the electrical equipment.

At step S203, it is determined whether a voltage of the external power source is within a predetermined range.

According to some embodiments, in response to determining that the voltage of the external power source is within the predetermined range ("YES"), the operation proceeds to step S205.

According to some embodiments, in response to determining that the voltage of the external power source is not within the predetermined range ("NO"), the method 200 ends. According to other embodiments, in response to determining that the voltage of the external power source is not within the predetermined range ("NO"), an instruction is issued to prompt that the voltage is abnormal. For example, a message of voltage anomaly is sent to an output apparatus (e.g., a display or a speaker) of the vehicle via a communication bus (e.g., a Controller Area Network (CAN) bus), causing the output apparatus to inform a user of the voltage anomaly, for example, by displaying on the display the message prompting that the voltage is abnormal, or causing the speaker to broadcast the message prompting that the voltage is abnormal. The predetermined range here may be set according to a charging voltage of the battery, a voltage of the generator and a working voltage of the electrical equipment in the vehicle, in some embodiments.

According to some embodiments, when the voltage of the external power source is not within the predetermined range, the control unit may adjust an output voltage of the external power source 120 according to a charging voltage of the battery, a voltage of the generator and a working voltage of the electrical equipment in the vehicle. In one example, a desired output voltage of the external power source 120 may be calculated according to the charging voltage of the battery, the voltage of the generator and the working voltage of the electrical equipment in the vehicle, and then displayed on an output apparatus, so that a worker may adjust the output voltage of the external power source 120 according to the desired output voltage. In another example, the control unit may communicate with the external power source 120 via a communication system of the vehicle and adjust the output voltage of the external power source 120 according to the desired output voltage. The communication system of the vehicle may provide the vehicle with a way to communicate with one or more devices or other vehicles in the vicinity.

In one exemplary embodiment, the communication system may communicate with the external power source 120 directly or through a communication network. The communication system may be, for example, a wireless communication system. For example, the communication system may use 3G cellular communication (e.g., CDMA, EVDO or GSM/GPRS) or 4G cellular communication (e.g., WiMAX or LTE), and may also use 5G cellular communication. Optionally, the communication system may communicate with a Wireless Local Area Network (WLAN) (e.g., using WIFI®). In some embodiments, the communication system may communicate directly with the external power source 120, for example, using infrared, Bluetooth® or ZIGBEE. Other wireless protocols, such as various vehicle-mounted communication systems, are also within the scope of the present application. For example, the communication system may comprise one or more Dedicated Short Range Communication (DSRC) apparatuses or V2X apparatuses that can be in data communication publicly or privately with the external power source 120.

According to some embodiments, a voltage at the power interface or a voltage at a connection point between the relay and the power interface is detected to determine whether the voltage of the external power source is within the predetermined range. The situation that power cannot be normally supplied to the electrical equipment or the electrical equipment is damaged due to the fact that the voltage of the external power source is abnormal is prevented by determining whether the voltage of the external power source is within the predetermined range. The predetermined range may be the same as the range of the supply voltage of the generator (also referred to as the voltage of the generator). In one example, the battery (see FIG. 5) of the vehicle has a supply voltage of 24 V, the voltage of generator is 27 V-28 V, and thus the predetermined range is 27 V-28 V. In the following description of the present application, unless otherwise specified, the predetermined range is 27V-28V. Those skilled in the art will appreciate that the predetermined range, the supply voltage of the battery and the voltage of the generator may be other values or ranges.

According to some embodiments, the relay comprises a first end electrically connected to the power interface and a second end electrically connected to the electrical equipment, wherein determining whether a voltage of the external power source is within a predetermined range in response to determining that the power interface is connected to the external power source comprises: initiating detection of a voltage on the first end of the relay in response to determining that the power interface is connected to the external power source; and determining whether the voltage on the first end of the relay is within the predetermined range.

At step S205, the relay is controlled to be switched on.

According to some embodiments, after the relay is controlled to be switched on, the external power source supplies power to the electrical equipment through the power interface and the relay. According to some embodiments, a message is sent to an output apparatus of the vehicle that the external power source is connected so as to inform a user that the external power source is connected.

In the power supply control method according to the embodiments of the present disclosure, when it is determined that the power interface is connected to the external power source and the voltage of the external power source is within the predetermined range, the relay between the electrical equipment and the power interface is controlled to be switched on, so that the external power source is used to supply power to the electrical equipment without using power from the generator or the battery of the vehicle.

According to some embodiments, the power supply control method for a vehicle further comprises: determining whether the engine is in a working state after the relay is controlled to be switched on; and issuing an instruction to turn off the engine in response to the engine being in the working state.

According to some embodiments of the present application, when the voltage of the external power source is within the predetermined range, the relay is switched on and the engine is turned off, and then the control unit is powered by the external power source, the power on the power distribution unit is also provided by the external power source, and meanwhile the external power source can charge up the battery.

Figure 3:
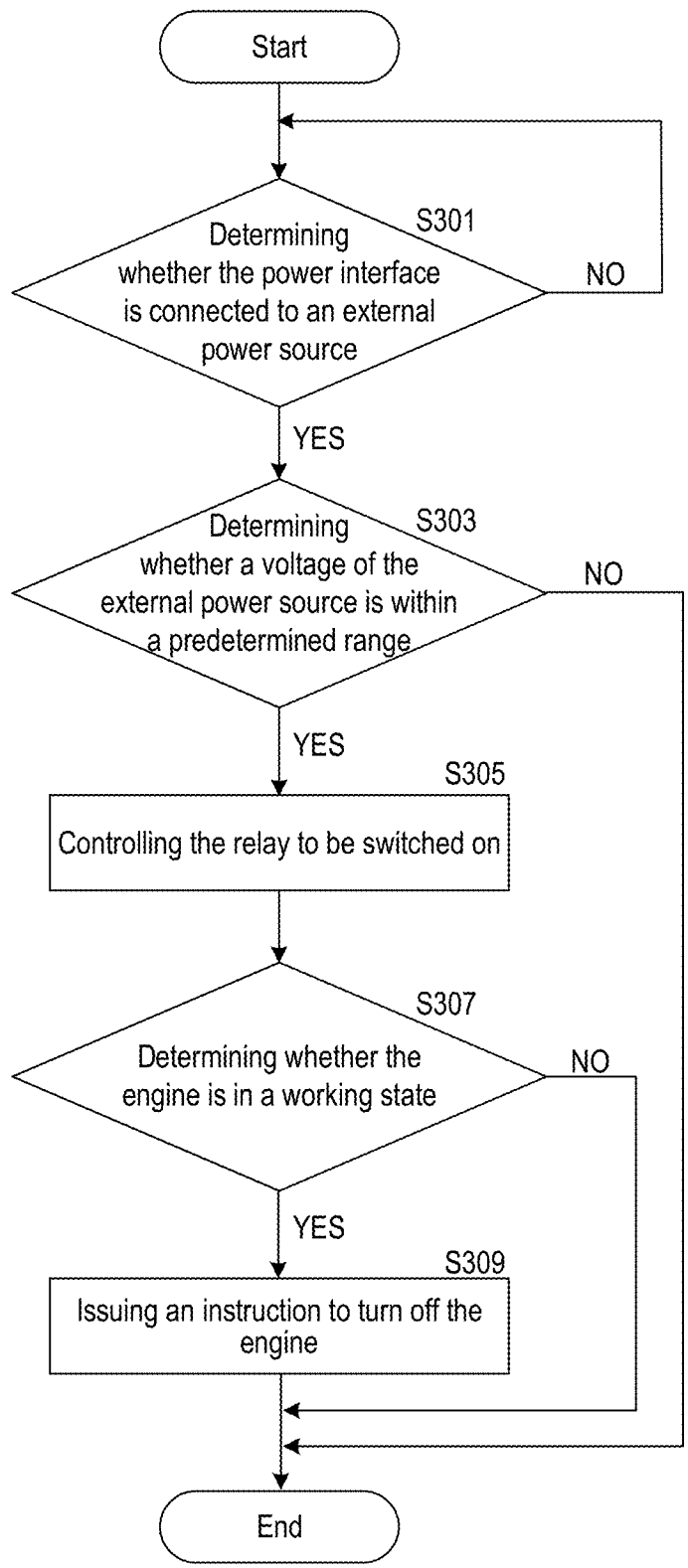
FIG. 3 is a flowchart of a power supply control method for a vehicle according to an exemplary embodiment.

FIG. 3 is a flowchart of a power supply control method 300 for a vehicle according to an exemplary embodiment. The vehicle may be, for example, a fuel-powered vehicle, and the engine of the vehicle may be a gasoline engine, a diesel engine or a hybrid engine. According to some embodiments, the method 300 may be performed by the control unit 104 in the vehicle 100 as shown in FIG. 1.

At step S301, it is determined whether the power interface is connected to an external power source. According to some embodiments, in response to determining that the power interface is connected to the external power source ("YES"), the operation proceeds to step S303. According to other embodiments, in response to determining that the power interface is not connected to the external power source ("NO"), the operation returns to step S301.

According to some embodiments, step S301 is similar to step S201 in FIG. 2.

At step S303, it is determined whether a voltage of the external power source is within a predetermined range. According to some embodiments, in response to determining that the voltage of the external power source is within the predetermined range ("YES"), the operation proceeds to step S305. According to other embodiments, in response to determining that the voltage of the external power source is not within the predetermined range ("NO"), the method 300 ends.

According to other embodiments, in response to determining that the voltage of the external power source is not within the predetermined range, an instruction is issued to prompt that the voltage is abnormal. For example, a message of voltage anomaly is sent to an output apparatus (e.g., a display or a speaker) of the vehicle via a communication bus (e.g., a CAN bus), causing the output apparatus to inform a user of the voltage anomaly, for example, by displaying on the display apparatus the message prompting that the voltage is abnormal, or causing the speaker to broadcast the message prompting that the voltage is abnormal. The predetermined range here may be set according to a charging voltage of the battery, a voltage of the generator and a working voltage of the electrical equipment in the vehicle.

According to some embodiments, when the voltage of the external power source is not within the predetermined range, the control unit may adjust an output voltage of the external power source 120 according to a charging voltage of the battery, a voltage of the generator and a working voltage of the electrical equipment in the vehicle. In one example, a desired output voltage of the external power source 120 may be calculated according to the charging voltage of the battery, the voltage of the generator and the working voltage of the electrical equipment in the vehicle, and then displayed on an output apparatus, so that a worker may adjust the output voltage of the external power source 120 according to the desired output voltage. In another example, the control unit may communicate with the external power source 120 via a communication system of the vehicle and adjust the output voltage of the external power source 120 according to the desired output voltage.

According to some embodiments, step S303 is similar to step S203 in FIG. 2.

At step S305, the relay is controlled to be switched on. According to some embodiments, step S305 may be, for example, similar to step S205 in FIG. 2.

At step S307, it is determined whether the engine is in a working state. According to some embodiments, in response to determining that the engine is in the working state ("YES"), the operation proceeds to step S309. According to other embodiments, in response to determining that the engine is not in the working state ("NO"), the method 300 ends.

According to some embodiments, whether the engine is in the working state may be determined by reading a signal on a communication bus (e.g., a CAN bus).

At step S309, an instruction is issued to turn off the engine.

According to some embodiments, a message is sent to an output apparatus of the vehicle prompting to turn off the engine, such that the output apparatus of the vehicle issues the message prompting the user to turn off the engine, for example, periodically (e.g., every 10 seconds) prompting the user to turn off the engine after the relay is controlled to be switched on while the engine has not been turned off, until the engine is turned off.

According to other embodiments, a turn off instruction is sent to the engine after the relay is controlled to be switched on while the engine has not been turned off, without user action.

In the power supply control method described in the embodiment of the present disclosure, the switching from the power supply by using the engine to the power supply by using the external power source is realized, so that the continuous and reliable power supply to the electrical equipment is ensured, and the environmental pollution caused by the operation of the engine when the vehicle is in a parked state is avoided.

According to some embodiments, the vehicle further comprises a power distribution unit located between the relay and the electrical equipment, wherein the power supply control method for a vehicle further comprises: controlling the power distribution unit to distribute power from the external power source to the electrical equipment after or when the relay is controlled to be switched on.

According to some embodiments, after the relay is controlled to be switched on, the control unit sends to the power distribution unit a message of distributing power from the external power source to the electrical equipment, and the power distribution unit, after receiving the message, distributes total power input from the external power source to each electrical equipment and feeds back its own voltage and current to the control unit.

According to some embodiments, the power supply control method for a vehicle further comprises: determining whether the engine has been started in response to the control unit being activated; and controlling the power distribution unit to distribute power from the battery or the generator to the electrical equipment in response to the engine having been started. For example, when the vehicle leaves the factory to perform an autonomous driving task, the control unit changes from the sleep state to the activated state after the vehicle receives an ignition signal transmitted by a key of the vehicle. After the engine is started, the control unit receives a message suggesting normal engine start through a communication bus (for example, a CAN bus), and the control unit then controls the power distribution unit to distribute power from the generator or the battery to the electrical equipment. When the vehicle completes the autonomous driving task and returns to the factory, the control unit needs to determine whether the power interface is connected to the external power source (i.e., performing step 201 or 301 above). For example, a power plug can be plugged into the power interface by a worker. The control unit may instruct the engine to be turned off after the external power source supplies power to the electrical equipment of the vehicle.

Figure 4:
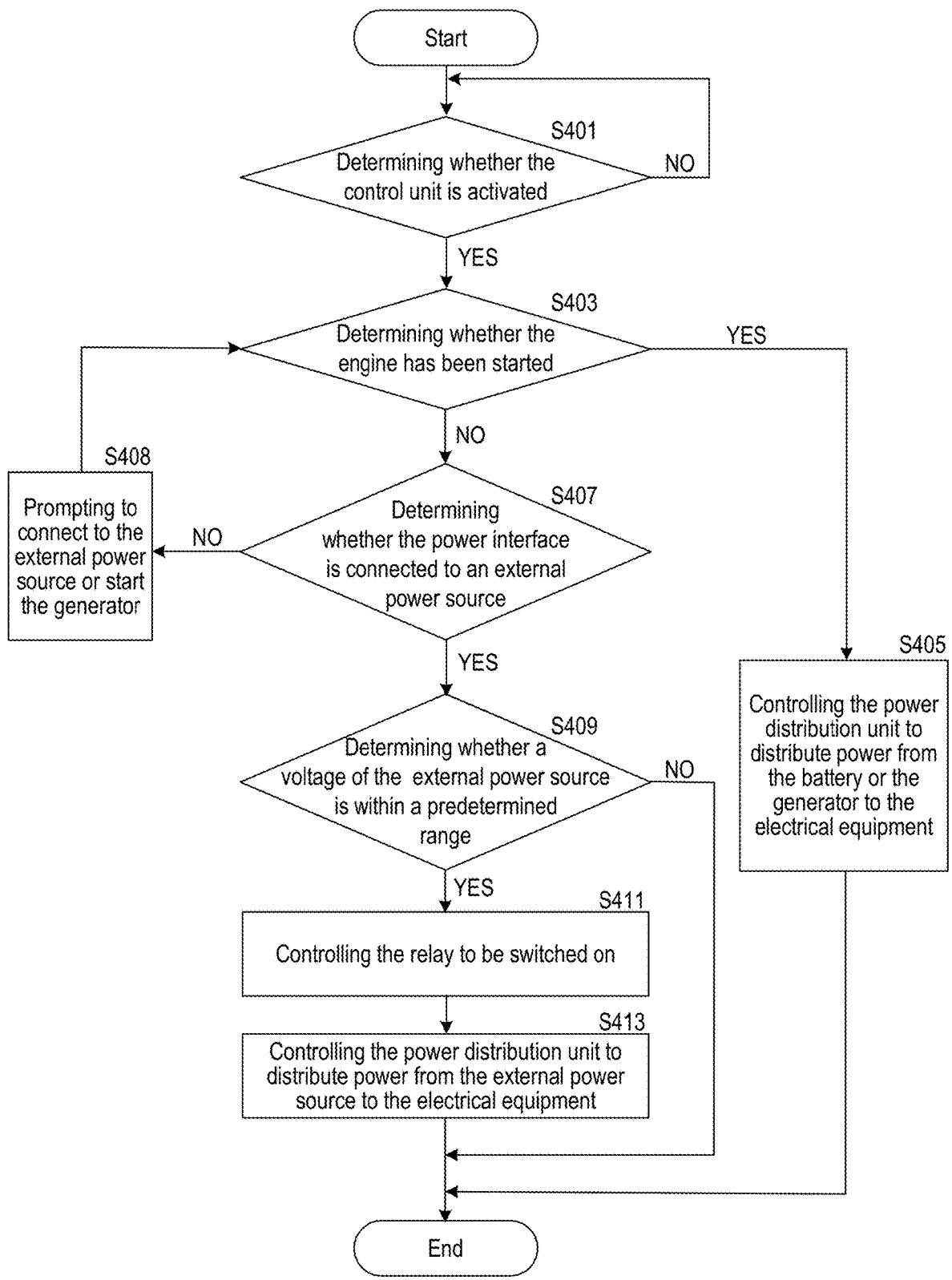
FIG. 4 is a flowchart of a power supply control method for a vehicle according to an exemplary embodiment.

FIG. 4 is a flowchart of a power supply control method 400 for a vehicle according to an exemplary embodiment. According to some embodiments, the method 400 may be performed by the control unit 104 in the vehicle 100 as shown in FIG. 1.

At step S401, it is determined whether the control unit is activated. According to some embodiments, in response to determining that the control unit is activated ("YES"), the operation proceeds to step S403. According to other embodiments, in response to determining that the control unit is not activated ("NO"), the operation returns to step S401 and the control unit remains in the sleep state.

According to some embodiments, the control unit is activated when a user inserts a vehicle key or the vehicle is started otherwise. According to some embodiments, after the control unit is activated, power is supplied to the output apparatus of the vehicle to send a prompt message to the user.

At step S403, it is determined whether the engine has been started. According to some embodiments, in response to determining that the engine has been started ("YES"), the operation proceeds to step S405. According to other embodiments, in response to determining that the engine has not been started ("NO"), the operation proceeds to step S407.

According to some embodiments, whether the engine has been started may be determined by reading a signal on a communication bus (e.g., a CAN bus), or may be determined by determining whether a normal start signal from the engine is received. According to some embodiments, it is determined that the engine is not started if the engine is not detected to be in the working state for a predetermined period of time (e.g., 10 s).

At step S405, the power distribution unit is controlled to distribute power from the battery or the generator to the electrical equipment.

According to some embodiments, the generator is driven by the engine to convert mechanical energy from the engine into electrical energy when the engine is in the working state. According to some embodiments, the generator provides electrical energy to the battery, and the power distribution unit distributes power from the battery to the electrical equipment. According to other embodiments, the power distribution unit distributes power from the generator to the electrical equipment.

At step S407, it is determined whether the power interface is connected to an external power source. According to some embodiments, in response to determining that the power interface is connected to the external power source ("YES"), the operation proceeds to step S409. According to other embodiments, in response to determining that the power interface is not connected to the external power source ("NO"), step S408 is performed.

According to some embodiments, step S407 is similar to step S201 in FIG. 2.

At step S408, in response to detecting that the engine is not started and the power interface is not connected to the external power source, a message prompting to start the engine or connect to the external power source is issued through an output apparatus of the vehicle to supply power to the electrical equipment.

At step S409, it is determined whether a voltage of the external power source is within a predetermined range. According to some embodiments, in response to determining that the voltage of the external power source is within the predetermined range ("YES"), the operation proceeds to step S411. According to other embodiments, in response to determining that the voltage of the external power source is not within the predetermined range ("NO"), the method 400 ends.

According to some embodiments, in response to determining that the voltage of the external power source is not within the predetermined range, an instruction is issued to prompt that the voltage is abnormal. For example, a message of voltage anomaly is sent to an output apparatus (e.g., a display or a speaker) of the vehicle via a communication bus (e.g., a CAN bus), causing the output apparatus to inform a user of the voltage anomaly, for example, by displaying on the display the message prompting that the voltage is abnormal, or causing the speaker to broadcast the message prompting that the voltage is abnormal.

According to some embodiments, when the voltage of the external power source is not within the predetermined range, the control unit may adjust an output voltage of the external power source 120 according to a charging voltage of the battery, a voltage of the generator and a working voltage of the electrical equipment in the vehicle. In one example, a desired output voltage of the external power source 120 may be calculated according to the charging voltage of the battery, the voltage of the generator and the working voltage of the electrical equipment in the vehicle, and then displayed on an output apparatus, so that a worker may adjust the output voltage of the external power source 120 according to the desired output voltage. In another example, the control unit may communicate with the external power source 120 via a communication system of the vehicle and adjust the output voltage of the external power source 120 according to the desired output voltage.

According to some embodiments, step S409 is similar to step S203 in FIG. 2.

At step S411, the relay is controlled to be switched on. According to some embodiments, step S409 is similar to step S205 in FIG. 2.

At step S413, the power distribution unit is controlled to distribute power from the external power source to the electrical equipment.

According to some embodiments, the power distribution unit distributes power from the external power source to the electrical equipment after the relay is switched on or when the relay is controlled to be switched on.

In the power supply control method described in various embodiments of the present disclosure, power supply to the electrical equipment when the vehicle switched from the sleep state to the activated state is realized, so that power can be supplied to the electrical equipment through the external power source without starting the engine. For example, if the vehicle has been parked in the factory for a long time, there may be a need to power up an autonomous driving system without starting the engine. The control unit may change from the sleep state to the activated state after the vehicle receives an ignition signal transmitted by a key of the vehicle (i.e., "YES" in step 401). Finally, at step S413, the power distribution unit distributes power from the external power source to the electrical equipment, thereby enabling powering up of the autonomous driving system without starting the engine.

According to some embodiments, the power supply control method for a vehicle described above with reference to FIGS. 2 to 4 may further comprise: detecting voltages and currents of the relay and the power distribution unit; and in response to the detected voltages and/or currents indicating a fault, performing at least one of: controlling the relay to be switched off; and controlling the power distribution unit to stop distributing power to the electrical equipment. According to some embodiments, a voltage and a current at one end of the relay connected to the power interface may be detected, and a voltage and a current at one end of the power distribution unit connected to the relay may be detected. The present application has carried out redundancy design as for collection of voltage and current signals from the perspective of function safety, and that is to say, not only the voltage and the current of the relay are collected and detected, but also the voltage and the current of the power distribution unit are collected, so as to avoid the situation that an anomaly cannot be dealt with in time because the collection of signals from a single element fails.

According to some embodiments, when the external power source is used to supply power to the electrical equipment after the relay is switched on, the detection of the voltages and the currents of the relay and the power distribution unit described above is performed so as to prevent the abnormal state of the external power source from damaging the electrical equipment or other components of the vehicle.

According to some embodiments, in response to the detected voltage and/or current at any of the relay or the power distribution unit indicating a fault, at least one of the following is performed: switching off the relay; and controlling the power distribution unit to stop distributing power to the electrical equipment, wherein the controlling the power distribution unit to stop distributing power to the electrical equipment comprises: switching off a power switch (such as a relay or a controllable switch) in the power distribution unit which is connected to the relay and/or controlling a power switching apparatus in the power distribution unit that supplies power to the electrical equipment to stop working.

According to some embodiments, the power supply control method for a vehicle further comprises: storing information corresponding to the fault, wherein the fault comprises at least one of a voltage fault and a current fault, the voltage fault comprising one of an over-voltage fault and an under-voltage fault, and the current fault comprising an over-current fault.

According to some embodiments, the information corresponding to the fault comprises: the time when the fault occurred, the type of fault, the voltage and current values at the time of the fault, etc.

According to some embodiments, the detected voltage or current being in a predetermined range for a predetermined length of time indicates a fault.

According to some embodiments, an over-voltage fault is determined to occur when the voltage at the relay or the power distribution unit exceeds an over-voltage threshold for a predetermined length of time. According to some embodiments, there may be multiple sets of over-voltage thresholds and corresponding predetermined lengths of time. For example, an over-voltage fault is determined to occur when the voltage at the relay or the power distribution unit exceeds a first over-voltage threshold (e.g., 29 V) for a first predetermined length of time (e.g., 1 s) or when the voltage at the relay or the power distribution unit exceeds a second over-voltage threshold (e.g., 30 V) for a second predetermined length of time (e.g., 0.2 s). According to some embodiments, the external power source is disconnected and/or the power distribution unit stops distributing power to the electrical equipment when the voltage of the external power source is too high, so as to avoid damaging the electrical equipment due to the too high voltage.

According to some embodiments, the low-voltage fault is determined to occur when the voltage at the relay or the power distribution unit is below a low-voltage threshold for a predetermined length of time. According to some embodiments, there may be multiple sets of low-voltage thresholds and corresponding predetermined lengths of time. For example, a low-voltage fault is determined to occur when the voltage at the relay or the power distribution unit is below a first low-voltage threshold (e.g., 25 V) for a first predetermined length of time (e.g., 20 s) or when the voltage at the relay or the power distribution unit is below a second low-voltage threshold (e.g., 24 V) for a second predetermined length of time (e.g., 10 s). According to some embodiments, the external power source is disconnected and/or the power distribution unit stops distributing power to the electrical equipment when the voltage of the external power source is too low, so as to avoid excessive consuming of the electrical energy in the battery by the electrical equipment, and thereby enable the vehicle to be started normally later.

According to some embodiments, an over-current fault is determined to occur when the current at the relay or the power distribution unit exceeds an over-current threshold (e.g., 300 A) for a predetermined length of time (e.g., 2 s). According to some embodiments, when the current at the relay or the power distribution unit is over-current (e.g., when a short circuit is present somewhere on the circuit from the external power source to the electrical equipment), the external power source is disconnected and/or the power distribution unit stops distributing power to the electrical equipment, so as to avoid damaging the electrical equipment due to excessive current.

It should be noted that the exemplary values of the thresholds given above are exemplified based on the predetermined range of the voltage of the external power source being 27V to 28V. Those skilled in the art will appreciate that the above threshold values may have different values based on different predetermined ranges of the voltage of the external power source.

Figure 5:
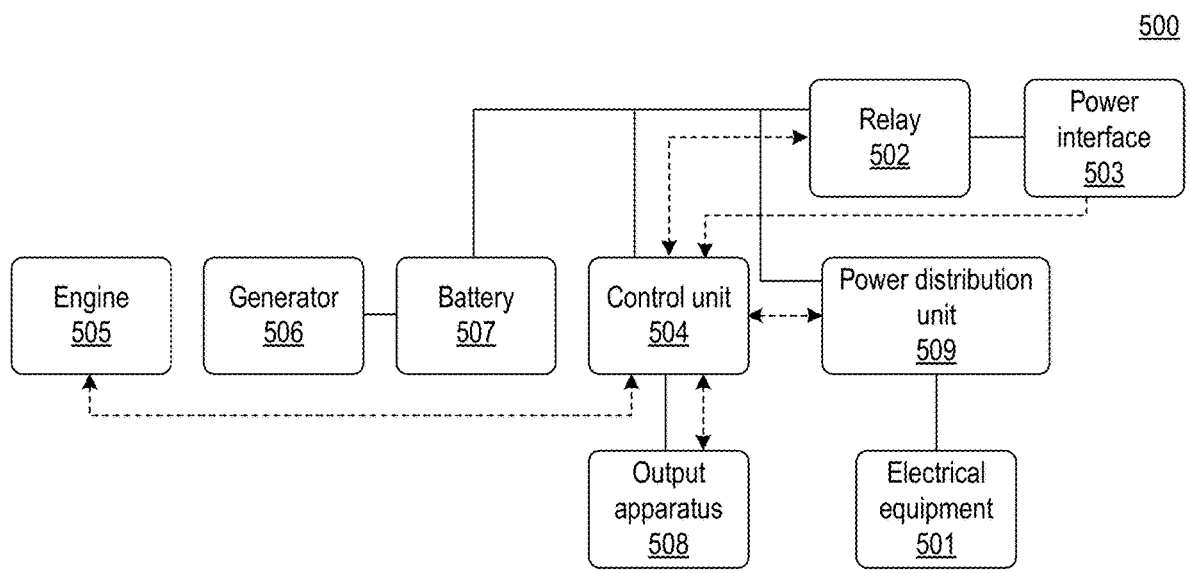
FIG. 5 is a structural block diagram of a vehicle according to an exemplary embodiment.

FIG. 5 is a structural block diagram of a vehicle 500 according to an exemplary embodiment, wherein signal connections are shown in dashed lines and power connections are shown in solid lines. The vehicle 500 of FIG. 5 may have mechanisms similar to those of the vehicle 110 of FIG. 1, and the power supply control method for a vehicle described above with reference to FIGS. 2 to 4 is also applicable to the vehicle 500 of FIG. 5.

As shown in FIG. 5, the vehicle 500 comprises an electrical equipment 501, a relay 502, a power interface 503, a control unit 504, an engine 505, a generator 506, a battery 507, an output apparatus 508 and a power distribution unit 509.

According to some embodiments, the vehicle 500 may receive power from an external power source via the power interface 503 and supply the power of the external power source to the electrical equipment 501, wherein the power interface 503 is electrically connected to the electrical equipment 501 via the relay 502 and the power distribution unit 509.

According to some embodiments, the control unit 504 is communicationally coupled with the relay 502 and the power interface 503, wherein the control unit 504 sends a control signal to the relay 502 to control the relay 502 to be switched on or off, or receives state information of the relay 502 (e.g., a current flowing through the relay 502 or a voltage at one end of the relay 502) from the relay 502, and the control unit 504 receives a state signal (e.g., an external power source connection signal) from the power interface 503.

According to some embodiments, the control unit 504 is configured for: determining whether the power interface 503 is connected to the external power source; determining whether a voltage of the external power source is within a predetermined range in response to the power interface 503 being connected to the external power source; and controlling the relay 502 to be switched on in response to the voltage of the external power source being within the predetermined range. According to some embodiments, when the engine 505 is in a working state, the engine 505 drives the generator 506 to convert mechanical energy from the engine 505 into electrical energy. According to some embodiments, the generator 506 is electrically connected to the battery 507 to store the generated electrical energy in the battery 507, and the battery 507 is electrically connected to the control unit 504 and the electrical equipment 501 to further provide the electrical energy in the battery 507 to the control unit 504 and the electrical equipment 501. According to other embodiments, the generator 506 is electrically connected to the control unit 504 and the electrical equipment 501, such that the generator 506 provides the electrical energy to the control unit 504 and the electrical equipment 501 directly (without passing through the battery 507).

According to some embodiments, the control unit 504 may acquire the state of the engine 505 or send instructions to the engine 505 (e.g., via a CAN bus) to control its state. According to some embodiments, the control unit 504 is configured for: determining whether the engine 505 is in a working state (i.e., whether the engine is started) after the relay 502 is controlled to be switched on; and issuing an instruction to turn off the engine 505 in response to the engine 505 being in the working state. According to other embodiments, the control unit 504 is configured for: determining whether the engine 505 has been started in response to the control unit 501 being activated, and determining whether the power interface 503 is connected to the external power source in response to the engine 505 not being started.

According to some embodiments, the control unit 504 is communicationally coupled with the power distribution unit 509 (e.g., communicationally coupled via a CAN bus), wherein the control unit 504 receives state information of the power distribution unit 509 (e.g., a voltage or a current of the power distribution unit 509) from the power distribution unit 509 and sends a control signal to the power distribution unit 509, e.g., to control the power distribution unit 509 to distribute power to the electrical equipment 501 or to stop distributing power to the electrical equipment 501.

According to some embodiments, the voltages and currents of the relay 502 and the power distribution unit 509 need to be detected, and the control unit 504 is configured for: in response to the detected voltages and/or currents indicating a fault, performing at least one of: switching off the relay 502; and controlling the power distribution unit 509 to stop distributing power to the electrical equipment 501.

According to some embodiments, the control unit 504 and the power distribution unit 509 are electrically connected to the relay 502 to receive power from an external power source when the external power source is connected, and the control unit 504 and the power distribution unit 509 are electrically connected to the battery 507 to receive power from the generator 506 or the battery 507 when the engine 505 is started (i.e., in a working state).

According to some embodiments, the output apparatus 508 is electrically connected to the control unit 504. According to some embodiments, the output apparatus 508 is communicationally coupled with the control unit 504 (e.g., via a CAN bus), so that messages can be sent to a user via the output apparatus 508 (e.g., via visual display or voice announcement).

According to some embodiments, the relay comprises a first end electrically connected to the power interface and a second end electrically connected to the electrical equipment (via the power distribution unit). When the control unit 504 determines that the power interface is connected to the external power source, the control unit initiates the detection of a voltage at the first end of the relay and determines whether the voltage at the first end of the relay is in a predetermined range, thereby determining whether the voltage of the external power source is in the predetermined range.

According to an embodiment of the present disclosure, further provided is a control unit, which comprises: at least one processor; and at least one storage having instructions stored therein, wherein the instructions, when executed by the at least one processor, cause the at least one processor to perform the method as described herein.

According to an embodiment of the present disclosure, further provided is a computer-readable storage medium having program instructions stored therein, wherein the instructions, when executed by a processor of a control unit, cause the control unit to perform the method as described herein.

According to an embodiment of the present disclosure, further provided is a computer program product comprising a computer program, wherein the computer program, when executed by a processor, implements the method as described herein.

Figure 6:
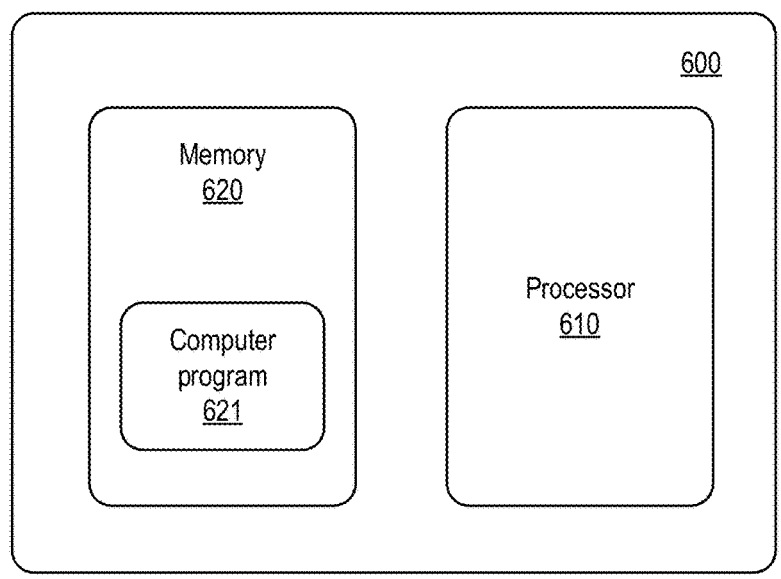
FIG. 6 is a structural block diagram of a control unit according to an exemplary embodiment.

FIG. 6 is a structural block diagram of a control unit 600 according to an exemplary embodiment. The control unit 600 of FIG. 6 may be used as the control unit 114 or the control unit 504 described above. As shown in FIG. 6, the control unit 600 comprises: at least one processor 610 (only one shown in FIG. 6), a memory 620, and a computer program 621 stored in the memory 620 and operable on the at least one processor 610. The steps in the power supply control method for a vehicle in the above-described embodiment are implemented when the processor 610 executes the computer program 621.

As shown in FIG. 6, the control unit 600 may include, but is not limited to, a processor 610 and a memory 620. It is to be appreciated that FIG. 6 is only an example of the control unit 600 and does not limit the control unit 600. For the control unit 600 (e.g., an Electronic Control Unit (ECU)), there may be more or less components than those shown, some of the components may be combined, or other different components may be present instead. For example, the control unit may further comprise an input-output module, a communication module, and the like.

The processor 610 may be a Central Processing Unit (CPU), and the processor 610 may be another general-purpose processor, a Digital Signal Processor (DSP), an Application Specific Integrated Circuit (ASIC), a Field-Programmable Gate Array (FPGA) or other programmable logic devices, discrete gates or transistor logic devices, discrete hardware components and the like. The general-purpose processor may be a microprocessor or the processor may be any conventional processor or the like. It should be understood that although only one processor 610 is shown in FIG. 6, FIG. 6 is merely exemplary and the control unit 600 may comprise more than one processor 610.

The memory 620 may, in some embodiments, be an internal storage unit of the control unit 600, such as a hard disk or a main memory of the control unit 600. The memory 620 may also be an external storage device of the control unit 600 in other embodiments, such as a plug-in hard disk, a Smart Media Card (SMC), a Secure Digital (SD) card and a Flash Card provided in the control unit 600. Further, the memory 620 may also comprise both an internal storage unit of the control unit 600 and an external storage device. The memory 620 is used for storing an operating system, an application program, a BootLoader, data, and other programs, such as program codes of a computer program. The memory 620 may also be used to temporarily store data that has been output or is to be output.

It should be noted that the vehicle described in the embodiments of the present application may be a car, a truck, a motorcycle, a bus, a watercraft, an airplane, a helicopter, a hay mower, an excavator, a snowmobile, an aircraft, a recreational vehicle, an amusement park vehicle, a farm equipment, a construction equipment, a tram, a golf cart, a train, a trolley bus or other vehicles. The vehicle may comprise an automatic driving system (i.e., one example of an electrical equipment as described above), such that the vehicle can be operated fully or partially in an autonomous driving mode. The vehicle can control itself in the autonomous driving mode. For example, the vehicle can determine a current state of the vehicle and a current state of an environment in which the vehicle is located, determine a predicted behavior of at least one other vehicle in this environment, and determine a trust level corresponding to a likelihood that the at least one other vehicle performs the predicted behavior, and thus the vehicle can control itself based on the determined information. The vehicle, when in the autonomous driving mode, can be operated without human interaction.

An autonomous driving system of a vehicle may comprise a sensor system, a computing system and/or a communication system.

The sensor system may comprise a plurality of sensors for sensing information about the environment and conditions of the vehicle. For example, the sensor system may comprise an Inertial Measurement Unit (IMU), a Global Navigation Satellite System (GNSS) transceiver (e.g., a Global Positioning System (GPS) transceiver), a Radio Detection and Ranging device (RADAR, or radar), a Laser Detection and Ranging system (LIDAR, or laser radar), an acoustic sensor, an ultrasonic sensor, and an image acquisition device (e.g., a camera).

A communication system, also referred to as a vehicle-mounted communication device, may provide the vehicle with a way to communicate with one or more devices or other vehicles in the vicinity. In one exemplary embodiment, the communication system may communicate with one or more devices directly or through a communication network. The communication system may be, for example, a wireless communication system. For example, the communication system may use 3G cellular communication (e.g., CDMA, EVDO or GSM/GPRS) or 4G cellular communication (e.g., WiMAX or LTE), and may also use 5G cellular communication. Optionally, the communication system may communicate with a Wireless Local Area Network (WLAN) (e.g., using WIFI®). In some embodiments, the communication system may communicate directly with one or more devices or other vehicles in the vicinity, for example, using infrared, Bluetooth® or ZIGBEE. Other wireless protocols, such as various vehicle-mounted communication systems, are also within the scope of the present application. For example, the communication systems may include one or more Dedicated Short Range Communication (DSRC) apparatuses, V2V apparatuses or V2X apparatuses that may be in data communication publicly or privately with vehicles and/or roadside stations.

The computing system can control some or all of the functions of the vehicle. An autonomous driving control unit of the computing system can be configured for identifying, evaluating and avoiding or bypassing potential obstacles in the environment in which the vehicle is located. In general, the autonomous driving control unit can be configured for controlling the vehicle in the absence of a driver or providing assistance to the driver in controlling the vehicle. In some embodiments, the autonomous driving control unit is configured for combining data from sensors, for example, data from a GPS transceiver, data from a radar, data from a LIDAR or data from a camera, with data from other vehicle systems, to determine a path or trajectory of travel for the vehicle. The autonomous driving control unit can be activated to enable the vehicle to be driven in an autonomous driving mode.

The computing system may comprise at least one processor (which may comprise at least one microprocessor) that executes processing instructions (i.e., machine-executable instructions) stored in a non-volatile computer-readable medium (e.g., a data storage apparatus or a storage). The computing system may also be a single computing apparatus. The computing system may also be a plurality of computing apparatuses that distributively control components or systems of the vehicle. In some embodiments, the storage may contain processing instructions (e.g., program logic) that are executed by the processors to implement various functions of the vehicle. In addition to storing processing instructions, the storage may store a variety of information or data, such as image processing parameters, road maps and path information. The information may be used by the vehicle and the computing system during operation of the vehicle in an autonomous mode, a semi-autonomous mode and/or a manual mode.

It will be understood that the phrase "an entity A initiates action B" as used herein may mean that the entity A issues instructions to perform action B, but the entity A itself does not necessarily perform this action B. For example, the phrase "the control unit initiates detection of the voltage/current" may mean that the control unit instructs a corresponding sensor (not shown) to detect the voltage/current, but the control unit itself doesn't need to perform the action of "detecting."

While embodiments or examples of the present disclosure have been described with reference to the accompanying drawings, it should be understood that the above-described methods, systems and devices are merely illustrative embodiments or examples, and that the scope of the present disclosure is not limited by these embodiments or examples, but only limited by the claims as granted and equivalents thereof. Various elements in the embodiments or examples may be omitted or may be replaced with equivalents thereof. Further, the steps may be performed in an order different from that described in the present disclosure. Further, the various elements in the embodiments or examples may be combined in various ways. All that matters is that as technology evolves, many of the elements described herein may be replaced by equivalent elements that appear after the present disclosure.

What is claimed is:

1. A power supply control method for a vehicle, wherein the vehicle comprises electrical equipment, a relay and a power interface, and wherein the power interface is electrically coupled to the electrical equipment via the relay, the power supply control method comprising:
   determining whether the power interface is coupled to an external power source;
   determining whether a voltage of the external power source is within a predetermined range when the power interface is coupled to the external power source; and
   controlling the relay to be switched on in response to the voltage of the external power source being within the predetermined range.

2. The power supply control method according to claim 1, wherein the vehicle further comprises a power distribution unit located between the relay and the electrical equipment, and wherein the power supply control method further comprises:
controlling the power distribution unit to distribute power from the external power source to the electrical equipment after or when the relay is controlled to be switched on.

3. The power supply control method according to claim 1, wherein the vehicle further comprises an engine, a control unit, a power distribution unit, a battery and a generator, the power distribution unit being located between the relay and the electrical equipment, and
wherein the power supply control method further comprises:
determining whether the engine has been started in response to the control unit being activated; and
controlling the power distribution unit to distribute power from the battery or the generator to the electrical equipment in response to the engine having been started.

4. The power supply control method according to claim 1, wherein the vehicle further comprises an engine and a control unit, and
wherein the power supply control method further comprises:
determining whether the engine has been started in response to the control unit being activated; and
wherein determining whether the power interface is coupled to an external power source comprises:
determining whether the power interface is coupled to the external power source in response to the engine not being started.

5. The power supply control method according to claim 1, further comprising:
issuing an instruction to prompt that the voltage is abnormal in response to determining that the voltage of the external power source is not within the predetermined range.

6. The power supply control method according to claim 1, wherein the vehicle further comprises a power distribution unit located between the relay and the electrical equipment, and
wherein the power supply control method further comprises:
determining whether voltages and currents of the relay and the power distribution unit indicate a fault; and
in response to the voltages or the currents of the relay or the power distribution unit indicating the fault, performing at least one of:
controlling the relay to be switched off; or
controlling the power distribution unit to stop distributing power to the electrical equipment.

7. The power supply control method according to claim 6, further comprising:
storing information corresponding to the fault, wherein the fault comprises at least one of a voltage fault and a current fault, the voltage fault comprising one of an over-voltage fault and an under-voltage fault, and the current fault comprising an over-current fault.

8. The power supply control method according to claim 6, wherein the voltages or the currents of the relay or the power distribution unit being in a predetermined range for a predetermined length of time indicates a fault.

9. The power supply control method according to claim 1, wherein the electrical equipment comprises at least one of a sensor, a vehicle-mounted communication device or a computing apparatus.

10. A vehicle, comprising:
an electrical equipment;
a relay;
a power interface electrically coupled to the electrical equipment via the relay; and
a control unit configured for:
determining whether the power interface is coupled to an external power source;
determining whether a voltage of the external power source is within a predetermined range when the power interface is coupled to the external power source; and
controlling the relay to be switched on in response to the voltage of the external power source being within the predetermined range.

11. The vehicle according to claim 10, further comprising an engine,
wherein the control unit is further configured for:
determining whether the engine is in a working state after the relay is controlled to be switched on; and
issuing an instruction to turn off the engine in response to the engine being in the working state.

12. The vehicle according to claim 10, further comprising an engine,
wherein the control unit is further configured for:
determining whether the engine has been started in response to the control unit being activated, wherein
determining whether the power interface is coupled to an external power source comprises:
determining whether the power interface is coupled to the external power source in response to the engine not being started.

13. The vehicle according to claim 10, further comprising:
a power distribution unit located between the relay and the electrical equipment,
wherein the control unit is further configured for:
initiating detection of voltages and currents of the relay and the power distribution unit; and
in response to the detected voltages or currents indicating a fault, performing at least one of:
controlling the relay to be switched off; or
controlling the power distribution unit to stop distributing power to the electrical equipment.

14. The vehicle according to claim 10, wherein the relay comprises a first end electrically connected to the power interface and a second end electrically coupled to the electrical equipment, and
determining whether a voltage of the external power source is within a predetermined range in response to determining that the power interface is coupled to the external power source comprises:
initiating detection of a voltage on the first end of the relay in response to determining that the power interface is coupled to the external power source; and
determining whether the voltage on the first end of the relay is within the predetermined range.

15. A non-transitory computer-readable storage medium having program instructions stored therein, wherein the instructions, when executed by a processor of a control unit, cause the control unit to:
determine whether a power interface of a vehicle is coupled to an external power source, the power interface being electrically coupled to electrical equipment of the vehicle via a relay;

determine whether a voltage of the external power source is within a predetermined range when the power interface is coupled to the external power source; and control the relay to be switched on in response to the voltage of the external power source being within the predetermined range.

16. The computer-readable storage medium according to claim 15, wherein the vehicle further comprises an engine, and wherein the instructions, when executed by the processor of the control unit, further cause the control unit to:

determine whether the engine is in a working state after the relay is controlled to be switched on; and issue an instruction to turn off the engine in response to the engine being in the working state.

17. The computer-readable storage medium according to claim 15, wherein the vehicle further comprises a power distribution unit located between the relay and the electrical equipment, and wherein the instructions, when executed by the processor of the control unit, further cause the control unit to:

control the power distribution unit to distribute power from the external power source to the electrical equipment after or when the relay is controlled to be switched on.

18. The computer-readable storage medium according to claim 15, wherein the vehicle further comprises an engine, a control unit, a power distribution unit, a battery and a generator, the power distribution unit being located between the relay and the electrical equipment, and wherein the instructions, when executed by the processor of the control unit, further cause the control unit to:

determine whether the engine has been started in response to the control unit being activated; and control the power distribution unit to distribute power from the battery or the generator to the electrical equipment in response to the engine having been started.

19. The power supply control method according to claim 1, wherein the vehicle further comprises an engine and a control unit, and wherein the power supply control method further comprises:

determining, by the control unit, whether the engine is in a working state after the relay is controlled to be switched on; and issuing, by the control unit, an instruction to turn off the engine in response to the engine being in the working state.

20. The power supply control method according to claim 1, wherein the vehicle further comprises a control unit, the relay comprises a first end electrically coupled to the power interface and a second end electrically coupled to the electrical equipment, and determining whether a voltage of the external power source is within a predetermined range comprises:

initiating, by the control unit, detection of a voltage on the first end of the relay in response to determining that the power interface is connected to the external power source; and determining, by the control unit, whether the voltage on the first end of the relay is within the predetermined range.

* * * * *